United States Patent [19]

Bakken et al.

[11] 4,400,420

[45] Aug. 23, 1983

[54] DRIP SHIELD AND THERMAL INSULATION COVER

[75] Inventors: Wendell J. Bakken, Renton; Phillip R. Ferguson, Seattle, both of Wash.

[73] Assignee: The Boeing Company, Seattle, Wash.

[21] Appl. No.: 383,682

[22] Filed: Jun. 1, 1982

[51] Int. Cl.³ .................. B32B 1/04; B32B 35/00
[52] U.S. Cl. .................. 428/99; 137/312; 428/192; 428/251; 428/263; 428/273; 428/282; 428/285; 428/286; 428/920
[58] Field of Search .............. 428/99, 192, 251, 263, 428/273, 920, 282, 285, 286; 137/312

[56] References Cited

U.S. PATENT DOCUMENTS

| | | | |
|---|---|---|---|
| 2,709,667 | 5/1955 | Grubb et al. | 428/920 |
| 3,092,530 | 6/1963 | Plummer | 428/920 |
| 3,521,629 | 7/1970 | Reynolds | 428/920 |
| 3,591,400 | 7/1971 | Palmquist et al. | 428/920 |
| 4,054,711 | 10/1977 | Botsolas | 428/920 |
| 4,164,605 | 8/1979 | Okawa et al. | 428/920 |
| 4,170,675 | 10/1979 | Grengrass | 428/920 |
| 4,223,064 | 9/1980 | Ballif et al. | 428/920 |
| 4,269,901 | 5/1981 | Chamberlain | 428/920 |

FOREIGN PATENT DOCUMENTS

| | | |
|---|---|---|
| 55-16829 | 5/1980 | Japan . |
| 2061818 | 5/1981 | United Kingdom . |

*Primary Examiner*—James C. Cannon
*Attorney, Agent, or Firm*—Morris A. Case; Bernard A. Donahue

[57] ABSTRACT

An elongated insulating cover of high temperature resistant cloth is impregnated on one side with a fluid sealing high temperature resistant flexible coating, and is covered on the other side with a metallic coating. Fasteners are secured along both sides of the cover; which cover is then overlapped around aircraft flammable fluid lines with the fluid sealing flexible coating on the inside, and the fasteners joined together.

13 Claims, 6 Drawing Figures

U.S. Patent  Aug. 23, 1983  Sheet 1 of 2  4,400,420
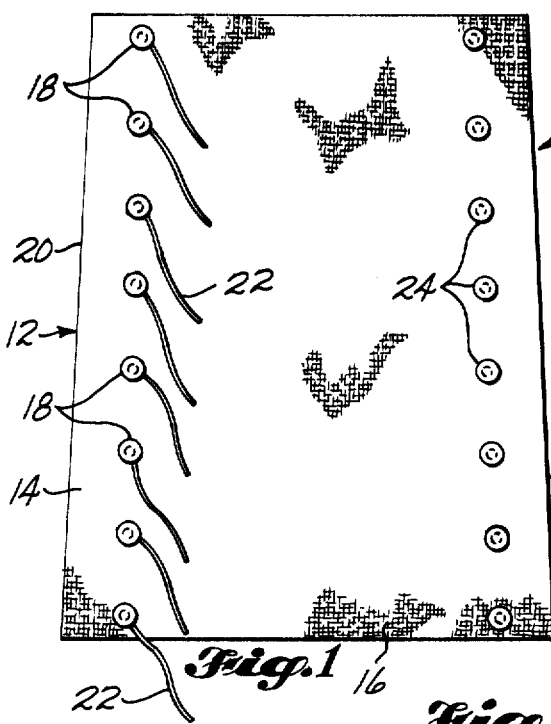
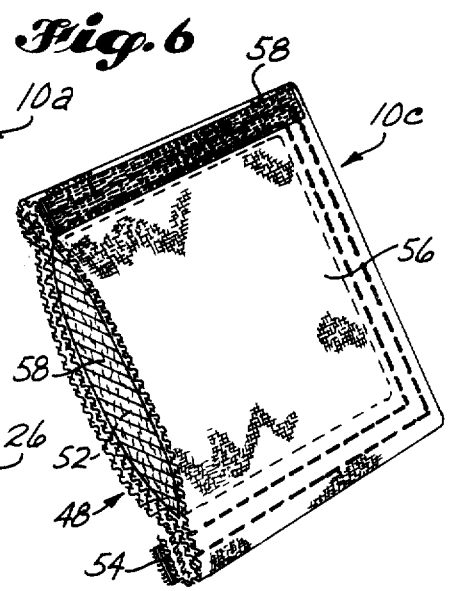
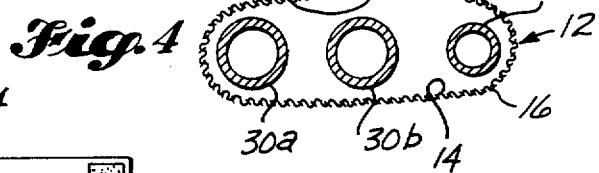
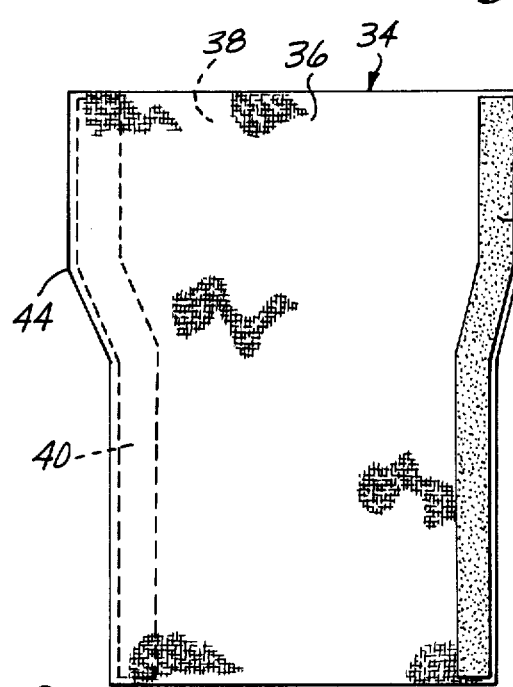
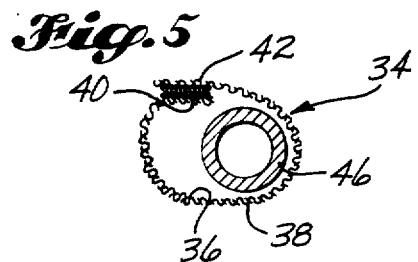

DRIP SHIELD AND THERMAL INSULATION COVER

BACKGROUND OF THE INVENTION

Plumbing lines servicing aircraft engines are subjected to considerable motion between the engine and the strut. When fluid lines between the engine and the strut are taken apart and reconnected there exists the possibility of undetected leaks due to human error. Occasionally the above conditions can create drips in the fluid lines, and if flammable fluids should drip onto a hot surface it could start a fire. It is common practice to use a metal raceway around certain lines in these potentially hazardous areas to catch any possible dripping fluid, and direct it to an area where it can drip overboard without touching any hot portions of the engine. These metal raceways restrict the motion of lines that are covered, and are unforgiving as to motion between engine and strut. It was found that a flexible high temperature resistant cover could be used that serves as a conduit for conducting any leaking fluids away from high temperature areas, acts as an insulator, and may be quickly and easily installed or removed for inspection.

SUMMARY OF THE INVENTION

High temperature resistant cloth is impregnated on one side with a flexible high temperature resistant sealing coating, and is covered on the opposite side with a metallic coating. The treated cloth is wrapped, with overlapping, around aircraft flammable fluid lines with the flexible sealing coating on the inside. Fasteners are located along each edge of the treated cloth, and are arranged to be secured to each other to secure the cloth around the flammable fluid lines.

It is an object of this invention to protect aircraft flammable fluid lines with a flexible insulating cover to direct potential leaks to a safe drip location.

DESCRIPTION OF THE DRAWINGS

FIG. 1 shows a flat pattern view of a cover of this invention for aircraft flammable fluid lines.

FIG. 2 shows a flat pattern view of a different embodiment of a cover of this invention for aircraft flammable fluid lines.

FIG. 4 shows a cross sectional view taken along line 4—4 of FIG. 3.

FIG. 5 shows a cross sectional view taken along line 5—5 of FIG. 3.

FIG. 6 shows a perspective view of another embodiment of this invention.

DETAILED DESCRIPTION

Figure 3:
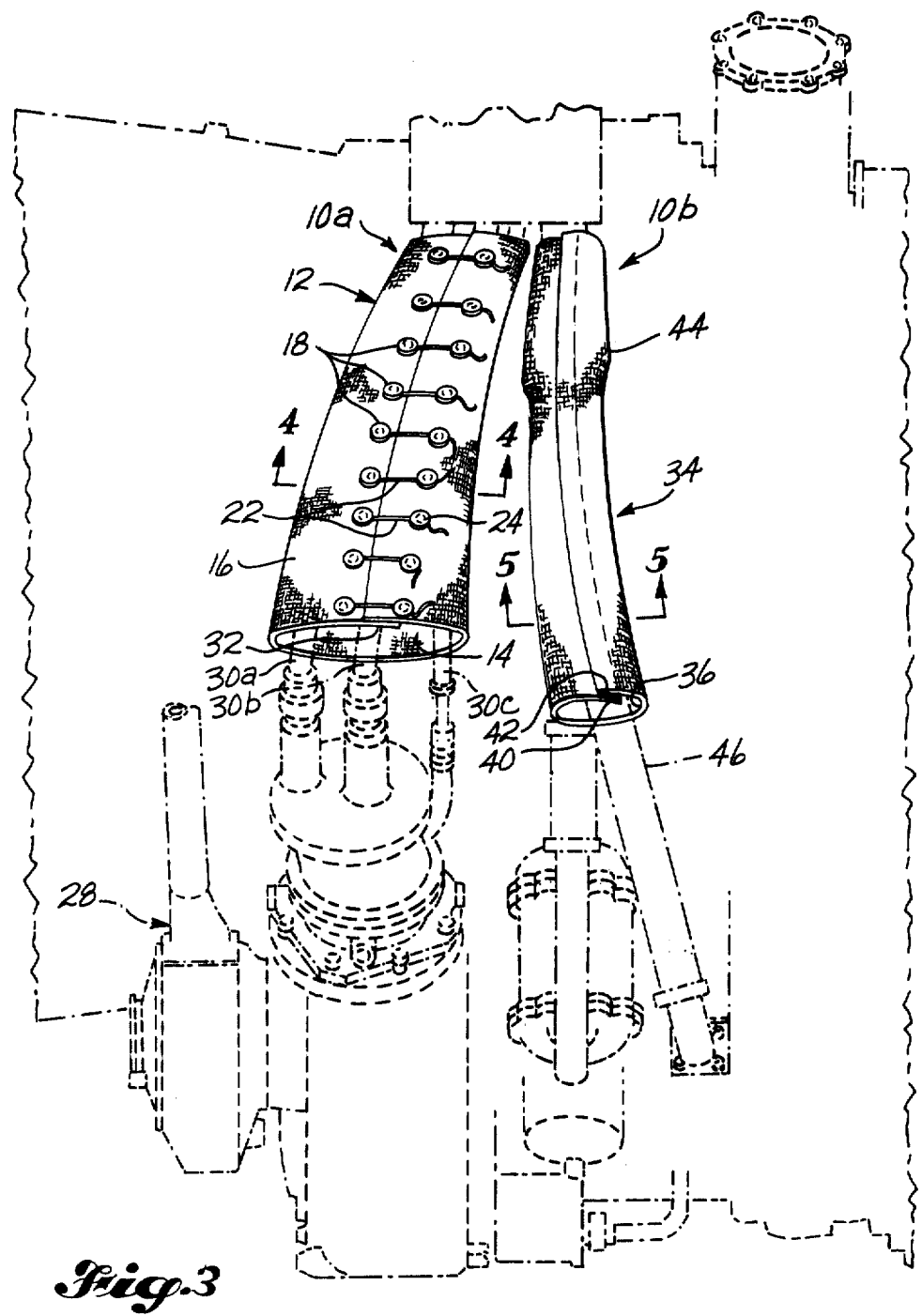
FIG. 3 shows a side view of aircraft engine accessories with flammable fluid lines covered by the inventions as set out in FIGS. 1 and 2.

Flexible insulating covers 10 are used on aircraft flammable fluid lines. Cover 10a, as shown in FIGS. 1, 3 and 4, is made up of a layer of glass cloth 12; which is impregnated on one side 14 with a silicone rubber that seals off the cloth to prevent the flow of fluid through the impregnated cloth. The other side of the cloth is coated with a reflective metallic coating 16; which preferably is aluminum applied to the surface by a vacuum deposit method. A row of fasteners 18 are secured to the impregnated coated cloth along a line adjacent side 20 of the cloth, and each fastener has a length of wire 22 secured to it. Another row of fasteners 24 are secured to the cloth adjacent the opposite side 26.

FIG. 3 shows the cover 10 as used in an aircraft engine accessory area 28. In that Figure, fluid transmitting lines 30a, 30b and 30c are wrapped. The cover, with the silicone rubber impregnated side 14 on the inside, is overlapped at 32, and the wires 22 wound around fasteners 24 to secure the cover in position.

FIGS. 2, 3 and 5 show a different embodiment of a cover 10b. That cover is made up of a layer of glass cloth 34, with one side of the cloth 36 impregnated with silicone rubber, and the other side coated with a reflective metallic layer 38 that is preferably a vacuum deposited aluminum. A Velcro strip 40 is sewed along the edge of the cloth on the side having the metallic coating, and a second and mating Velcro strip 42 is secured along the edge on the silicone impregnated side. These covers readily lend themselves to narrowing or widening as required, and this cover is widened at 44. In FIGS. 3 and 5, the cover 10b is shown covering line 46, with the silicone impregnated side of the cover on the inside to control any possible drips.

FIG. 6 shows yet another embodiment of a cover 10c. That cover is made up of two layers of glass cloth 48 and 50 that are joined together along all the edges. The layer 48 is covered along the outside surface with a metallic coating 52, and a strip of Velcro 54 is secured to the edge of that surface. The outside surface of layer 50 is impregnated with silicone rubber 56 and a strip of Velcro 58 is secured to the edge of that surface. The cover made up of these two layers is then used to cover aircraft flammable fluid lines with the silicone layer inside and the Velcro strips joined together. It is not desired to limit this embodiment to the use of Velcro as other fasteners may also be used. As a variation to this embodiment, an insulating layer or layers 58 is or are placed between the two outer layers and the additionally insulated cover used as set out above. The inside layers are preferably of glass cloth; however, glass wool may be used for the inside layers.

We claim:

1. A flexible fluid resistant cover comprising: a fabric of high temperature resistant material of a width to overlap around aircraft flammable fluid lines to direct any leaking fluids away from potential fire areas, a temperature resistant flexible plastic impregnating the inside surface of the fabric, a metallic reflective coating on the outside surface of the fabric, and means for quickly attaching and removing the treated fabric from the flammable fluid lines.

2. A flexible fluid resistant cover as in claim 1 wherein the means for quickly attaching and removing the treated fabric comprises a pair of matching Velcro strips secured along the overlapping sides of the fabric.

3. A flexible fluid resistant cover as in claim 1 wherein the means for quickly attaching and removing the treated fabric comprises a row of fasteners extending along one of the sides of the fabric, a second set of matching fasteners extending along the second side of the fabric, and means for joining the matching fasteners together to secure the treated fabric to the flammable fluid lines.

4. A flexible fluid resistant cover for aircraft flammable fluid lines comprising: an elongated strip of high temperature resistant cloth of a width for overlapping around aircraft flammable fluid lines, a high temperature resistant flexible material impregnating and sealing off the inside surface of the temperature resistant cloth, a metallic reflective coating on the outside surface of the cloth, and means for joining together the overlapping sides of the coated cloth to direct any leaking fluids away from hot surfaces.

5. A flexible fluid resistant cover for aircraft flammable fluid lines comprising: two layers of high temperature resistant cloth with the two layers having a width for overlapping around aircraft flammable fluid lines, a high temperature resistant flexible material impregnating and sealing off the inside surface of the layers of cloth, a metallic reflective coating on the outside surface of the layers of cloth, and means for joining together the overlapping sides of the layers of cloth to insulate the aircraft flammable fluid lines and to direct any leaking fluids away from potential fire areas.

6. A flexible fluid resistant cover for aircraft flammable fluid lines as in claim 5 with the cover further comprising at least one layer of thermal insulation between the two layers of cloth.

7. A flexible fluid resistant cover for aircraft flammable fluid lines comprising: at least one layer of glass cloth, a silicone rubber impregnating and sealing off one of the outer surfaces of the glass cloth, a metallic reflective coating on the other outer surface of the glass cloth to in combination create a cover that wraps around aircraft flammable fluid lines with the silicone seal on the inside to direct any leaking fluids away from potential fire areas, and means for securing the wrapped cover to the lines.

8. A flexible fluid resistant cover for aircraft flammable fluid lines as in claim 7 wherein the means for securing the wrapped cover to the lines comprises: a Velcro strip secured to the outer surface and adjacent an edge of the wrapped cover, a second Velcro strip secured to the inner surface and adjacent the opposite edge of the wrapped cover, and the strips joined together.

9. A flexible fluid resistant cover for aircraft flammable fluid lines as in claim 7 wherein the means for securing the wrapped cover to the lines comprises: a row of fasteners secured along the outer side of the cover and adjacent one edge, a row of aligned fasteners secured along the outer side of the cover and adjaent the opposite edge of the cover, and a wire secured to each fastener in one of the rows of fasteners with the wire of a length to be wrapped around the opposite row of fasteners.

10. A flexible fluid resistant cover for aircraft flammable fluid lines as in claim 7 wherein the reflective metal coating is aluminum.

11. A flexible fluid resistant cover for aircraft flammable fluid lines as in claim 10 wherein the aluminum coating is vacuum deposited.

12. A flexible fluid resistant cover for aircraft flammable fluid lines as in claim 7 with the cover further comprising: the glass cloth having two layers, and a liner between the two layers of cloth with the liner having at least one layer of glass cloth.

13. A flexible fluid resistant cover for aircraft flammable fluid lines as in claim 7 with the cover further comprising: the glass cloth having two layers, and a glass wool liner between the two layers of cloth.

* * * * *